United States Patent [19]

Snowdon

[11] 4,073,244
[45] Feb. 14, 1978

[54] MATERIAL HANDLING APPARATUS

[75] Inventor: Brian Snowdon, Doncaster, England

[73] Assignee: Macawber Engineering Limited, England

[21] Appl. No.: 692,423

[22] Filed: June 3, 1976

[30] Foreign Application Priority Data

June 9, 1975 United Kingdom ............... 24642/75

[51] Int. Cl.² ............................ F23J 1/00; F23J 3/00
[52] U.S. Cl. .................................. 110/165 R; 302/22
[58] Field of Search ............... 110/165 R, 165 A, 166, 110/167; 302/22; 251/208, 209

[56] References Cited

U.S. PATENT DOCUMENTS

| 867,068 | 9/1907 | McClave | 302/22 |
| 1,988,473 | 1/1935 | Bennett | 110/165 |
| 2,346,068 | 4/1944 | Foresman | 110/165 |
| 3,191,906 | 6/1965 | Zeigler et al. | 251/208 |

Primary Examiner—Kenneth W. Sprague
Attorney, Agent, or Firm—Stevens, Davis, Miller & Mosher

[57] ABSTRACT

Material handling apparatus for moving particulate material from at least two delivery points into a single pipeline and along the pipeline to a destination, the apparatus including at least two material inlets to the pipeline, each inlet provided with a closure member capable of sealing that inlet, and means for supplying compressed air for moving material along the pipeline.

4 Claims, 8 Drawing Figures

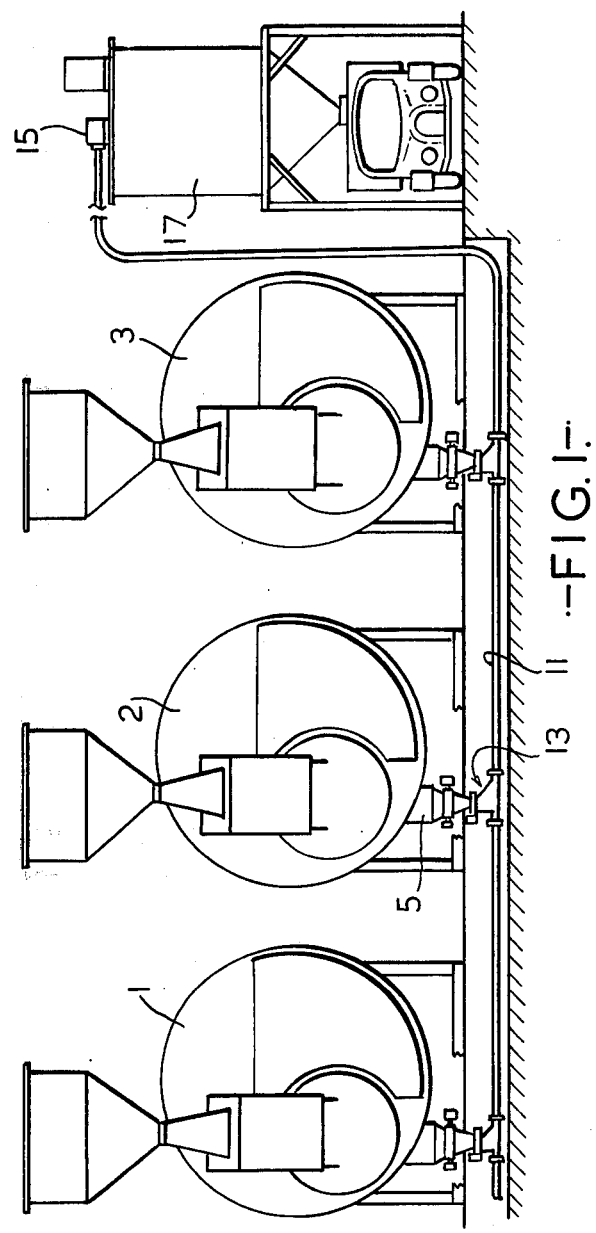

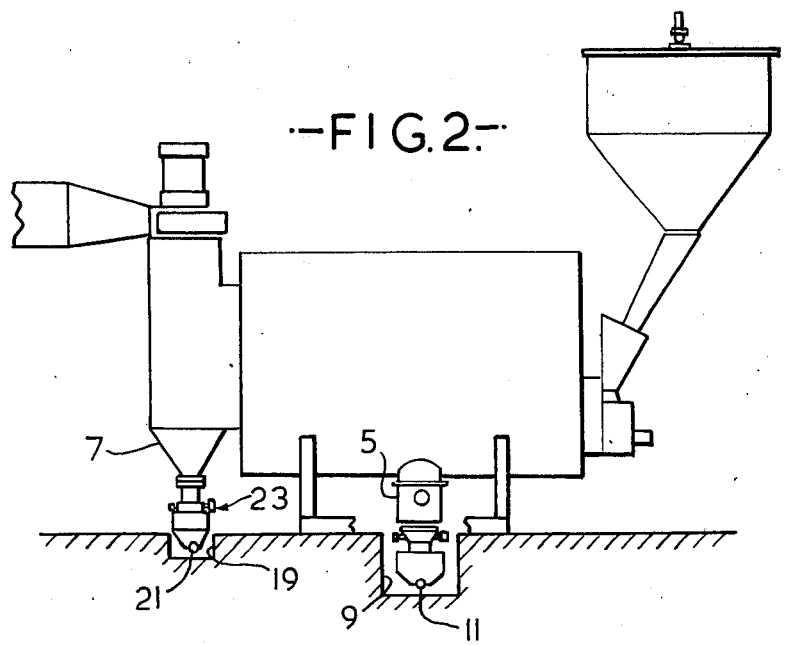
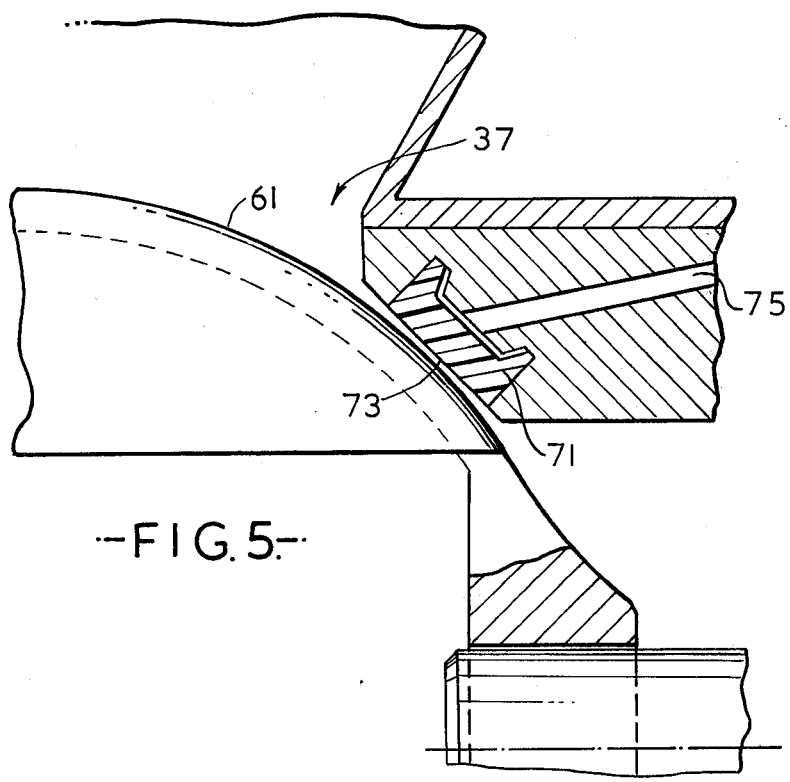

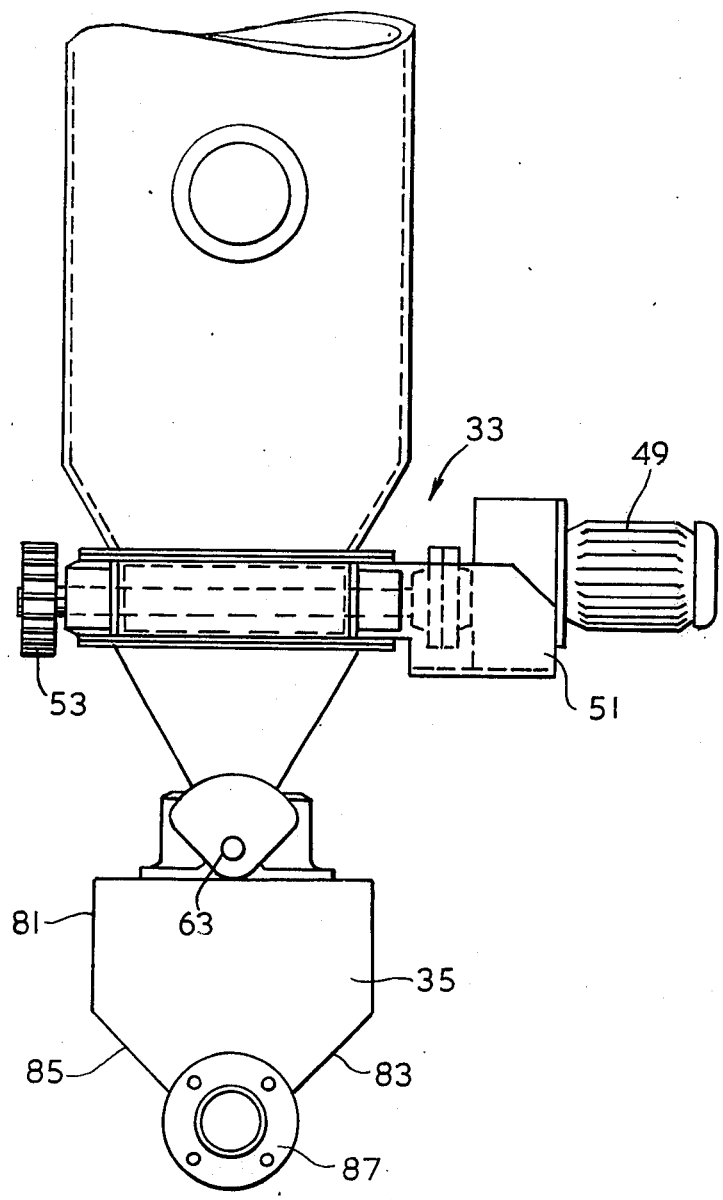
-FIG. 4.-

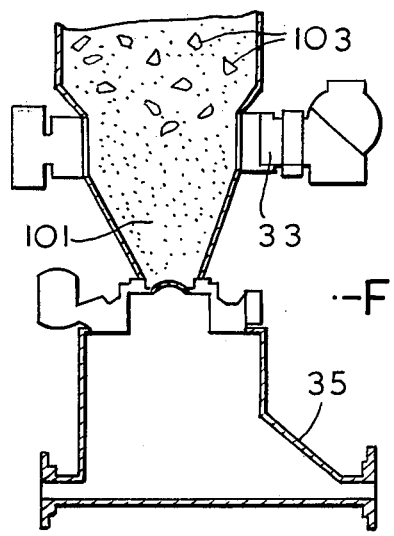
-FIG.6.-
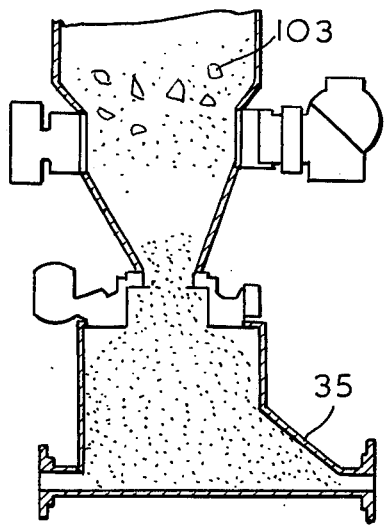
-FIG.7.-
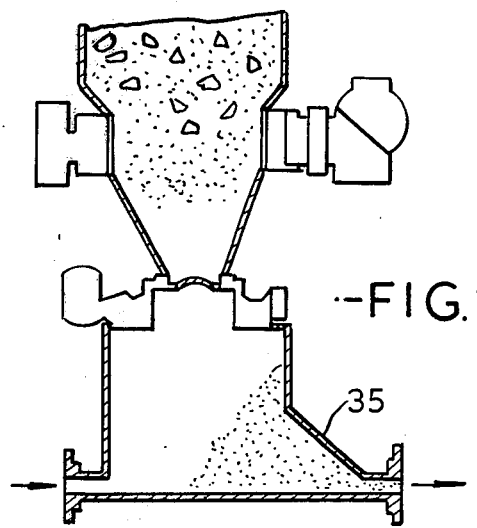
-FIG.8.-

MATERIAL HANDLING APPARATUS

This invention relates to material handling apparatus of the kind in which a particulate material may be caused to move so as to pass along a pipeline from one site to another site.

Previously, material handling apparatus for conveying abrasive, granular materials from a plurality of sites to one or more destinations has involved a separate pipeline from each site to the destination of the material from that site. The material is fed into the pipeline and is sucked along the pipeline to its destination. Such negative pressure systems have hitherto been utilised because they were considered to be more efficient than systems involving the application of positive pressure. It was thought that there was too great a pressure loss with the latter, particularly via the material inlet.

According to the present invention there is provided material handling apparatus, comprising a pipeline of the like, having a compressed air inlet and a material outlet, and at least two material inlet members located between said compressed air inlet and said material outlet, each material inlet members having a closure member which is moveable between an open position at which material may be passed into the pipeline and a closed position at which the material inlet member is substantially sealed to prevent the passage of compressed air from the pipeline via said inlet member.

In apparatus according to the present invention material from at least two sites may be "loaded" into a single pipeline through inlet members at each site and the material thus loaded into the pipeline is "pushed" along the pipeline by means of compressed air towards a material outlet located further along the pipeline.

Two or more material inlets are arranged in series along the pipeline so that a single pipeline may be used for the transfer of material from a plurality of sites to one or more destination points along the pipeline.

Apparatus in accordance with the present invention may be used for the handling of many materials and may for instance be used for conveying ash and grit from boilers where coal is being burnt to sites remote from the boilers. Ash and grit are abrasive materials containing either acidic or alkaline materials which when moist attack most metals. Ash also normally contains large particles of fused, hard deposits of varying size and compositions. Apparatus in accordance with the present invention may handle ash and grit without the need for fluidization, which has previously been the cause of high pipeline wear rates and poor handling ecomomy. Thus the use of a positive pressure system for moving the material along the pipeline means that one can move the material at a low speed in the pipeline without the need to fluidise the material. Furthermore a low air-/material ratio is maintained while the material is being pushed along the pipeline. A material speed as little as 1/10th that associated with known suction systems is possible. This low speed together with the low level of activity of the granules of the material during conveying ensures long life for the pipework.

The boilers in which coal is burnt normally have separate outlets for ash and grit and all the ash outlets may be linked to one ash conveying pipeline and all the grit outlets may be linked to a single grit conveying pipeline. The ash particles may be quite large and it is necessary to incorporate a device for reducing the size of the ash before it is deposited into the pipeline. However, since the particles are not to be fluidised, it is not necessary that the particle size be uniform as is the case with ash suction systems. Accordingly it is merely necessary to incorporate an ash breaker which will reduce the particle size of the larger particles including clinker. A crushing device such as those associated with known suction systems is not necessary.

Each material inlet member provided with the apparatus in accordance with the present invention may itself be a container which is located above the pipeline and opens into the pipeline at the bottom end thereof and which is closable at its upper end by means of the closure member. Preferably the closure member includes a part spherical valve member which is rotatable between the open position in which material may fall into the material inlet member and thence into the pipeline and a closed position in which the material inlet member is sealed to prevent the escape of compressed air from the pipeline.

The previously known suction conveying systems have certain other disadvantages associated with them besides those mentiond above, for instance:

1. Small size particles such as fine ash particles are carried through the suction filter arrangement into the prime movers generating the negative pressure resulting in high wear and frequent breakdowns of the prime movers, in spite of the fact that large and elaborate filters are provided to protect the suction equipment as far as possible.

2. The system is inefficient particularly as far as the conveying of larger lumps of material is concerned, and is limited to a maximum negative pressure of 14.7 lb/in$^2$.

3. Automatic operation of this sytem is difficult if not impossible and it is normally necessary to include manually operated and supervised gates for isolating the material from the supply into the suction system.

Apparatus in accordance with the present invention avoids these disadvantages since:

1. There is need for only a small pressure relief filter unit of simple construction, for instance, on the ash or grit receiving hopper.

2. The apparatus is not sensitive to particle size except in as far as very large particles are concerned. 3. The apparatus can be operated in a completely automatic manner.

An embodiment of the invention will now be described by way of example only and with reference to the accompanying drawings, in which:

FIG. 1 is a diagrammatic view showing coal fired boilers and incorporating material handling apparatus in accordance with the present invention;

FIG. 2 is a diagrammatic side view of the system shown in FIG. 1;

FIG. 4 is a view on arrow A of the system shown in FIG. 3;

FIG. 5 is a detailed view of the dome valve head seal of the ash discharge chamber for the system shown in FIG. 3; and FIGS. 6, 7 and 8 are diagrammatic views showing part of the system in various stages of its operation.

Figure 3:
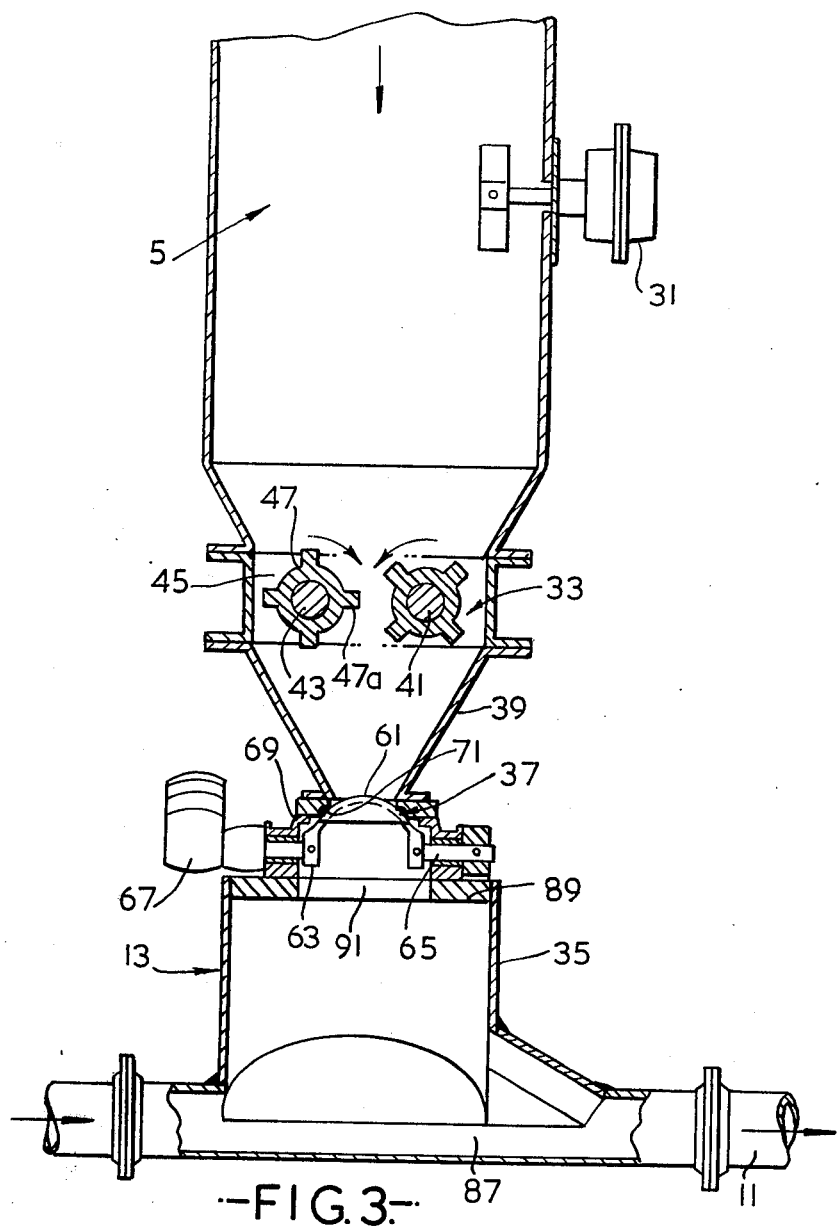
FIG. 3 is a vertical cross-section through part of an ash conveying system similar to that shown in FIG. 1.

Referring to FIGS. 1 and 2 there are shown three side by side positioned coal fired boilers 1, 2 and 3. These boilers are of conventional form and include separate exits 5 and 7 for ash and grit respectively. A shallow pit 9 runs under each of the ash exits 5 and located within pit 9 is a pipeline 11. Each of the ash exits 5 communicates with the pipeline 11 by means of an ash inlet member shown generally at 13. At one end of the pipeline 11 (not shown in the drawings) there is provided a device for supplying compressed air to the pipeline. At the other end the pipeline runs into a terminal box 15 which includes a deflector plate for deflecting the material downwardly into a storage hopper 17 from which the material may be transferred as desired into lorries.

In a similar way a shallow channel 19 runs under each of the grit exits 7 and located within channel 19 is a pipeline 21. Each grit exit communicates with the pipeline by means of a grit inlet member 23. Pipeline 21 also has associated therewith a compressed air device at one end and some form of terminal box or the like at the other end.

Referring to FIGS. 3 to 5, there is shown in greater detail the ash exit 5 and the ash inlet member 13 which connects the ash exit 5 with the pipeline 11. Ash exit 5 is in the form of a substantially cylindrical tube and is provided with a level probe 31 which indicates the presence or absence of ash in tube 5 at the level of probe 31.

Mounted below tube 5 is an ash breaker 33 which functions to break up larger particles of ash before they pass downwardly beyond ash breaker 33.

Located below ash breaker 33 is an ash discharge chamber 35 which is provided with a dome valve 37, which latter operates to open or close the discharge chamber to material passing downwardly from the ash breaker through short hopper section 39. The ash discharge chamber 35 connects at its bottom end with pipeline 11.

The ash breaker 33 will not be described in greater detail. It includes two parallel mounted shafts 41, 43 which are mounted within a housing 45 and to each of which is rigidly keyed an ash breaking member 47. Member 47 includes four flanges 49 which are spaced apart about its periphery. Ash breaker 33 includes a drive motor 49 and a reduction gear box 51. It also includes gears 53 which transmit the drive to both shafts 41, 43. The shafts 41, 43 are caused to rotate in opposite directions as shown by the arrows in FIG. 3. Larger lumps of ash are moved by the ash breaker members 47 to a central position between the shafts and are then broken by the action of the flanges 49 while they are passing between the shafts, smaller pieces of ash pass between or around the shafts without being affected by the ash breaker members 47.

The dome valve 37 will now be described in greater detail. Dome valve 37 includes a part spherical shaped valve member 61 which is connected to dependant arms 63 which in turn are mounted for rotation on shafts 65. Connected to one shaft 65 is a pneumatic rotary actuator 67 which is capable of rotating valve member 61 through 90°.

The dome valve is mounted within a housing 69 located above ash discharge chamber 35 and valve member 61 is rotatable between an open position in which material dropping down from ash breaker 23 may pass directly into ash discharge chamber 35 and a closed porition in which material passing downwardly from ash breaker 33 is prevented from entering ash discharge chamber 35. Furthermore that part of the housing adjacent the edge of the dome valve is provided with an annular rubber seal 71, the free surface 73 of which is directed towards the surface of the part spherical member 61. Seal 71 is recessed into the housing and is bonded to the metal surface of the housing about its sides only. The back of the seal is not bonded to metal and communicates with a bore 75 by means of which compressed air may be fed to the back of the seal. Thus when the dome valve is in the closed position the seal 71 may be pressed against the surface of valve member 61 by means of the compressed air applied to the rear side of the seal 71. In this way the pipeline 11 and the ash discharge chamber 35 may be effectively sealed to prevent the escape of compressed air from the pipeline and discharge chamber via the dome valve 37.

The ash discharge chamber 35 will now be described in greater detail. The ash discharge chamber 35 is generally cylindrical in shape having a circular cylindrical wall 81, but the lower portion of the chamber is provided with flat inardly inclining walls 83, 85 so that the bottom of the chamber opens into and is integral with pipeline fitting 87 which in turn is connected at each of its ends to the pipeline 11. Discharge chamber 35 is provided with a flat upper wall 89 which is provided with a central opening 91 above which the dome valve 37 is mounted. The direction of movement of the material and compressed air along pipeline 11 is shown by the arrow in FIG. 3 and it will also be seen that the wall of discharge chamber 35 is angled at the right hand side adjacent to pipeline fitting 87 so as to avoid a sharp corner at this position between the chamber 35 and the pipeline fitting 87. In this way the abrasive particles which move along the pipeline 11 will not have such a severe effect on this portion of the discharge chamber.

FIGS. 6 to 8 illustrate the operation of that part of the system which is shown in FIGS. 3 to 5. In FIG. 6 ash including fine particles 101 and large particles 103 is located above dome valve 37. The large particles 103 are prevented by ash breaker 33 from passing downwardly beyond ash breaker 33. In FIG. 7 dome valve 37 is open and the ash passes downwardly into ash discharge chamber 35. The ash breaker is also operated so as to reduce the size of the large particles 103 before they pass downwardly into the discharge chamber 35. In FIG. 8 the dome valve has been closed again and compressed air is applied to the pipeline so that the ash contained in discharge chamber 35 is pushed out of the chamber and along the pipeline in the direction shown by the arrow.

The grit conveying system is similar to the above described ash conveying system except that in the grit system there is no need to include breakers since the particle size of the grit presents no problems. Generally it should be appreciated that the nature of the dome valve is such that quite sizable chunks of material can be handled and it is only necessary to include breakers where the material includes large lumps. The valve member of the dome valve is such that it can "slice" through material, including sizable chunks, which is piled up in the dome valve, and can then form an effective seal with the rubber seal 71.

Both the ash and grit systems can be operated entirely automatically. Thus referring to the ash system, the ash accumulates above the dome valve until it reaches the level of probe 31. Probe 31 sends a signal which operates the opening of dome valve 37 and the operation of ash breaker 33. This continues until the ash discharge chamber is full of ash. Then the dome valve closes and high pressure air is applied to the pipeline 11. The air pushes the ash from discharge chamber 35 along the pipeline 11 to the terminal box 15 and into hopper 17. Once the probe 31 has indicated sufficient material to initiate the breaking and the conveying, a pre-set number of conveying cycles take place until the accumulated material above the ash breaker is consumed. During this period the ash breakers etc., associated with the other boilers remain inoperative until the breaking and conveying sequence is completed at the boiler in question.

The period of ash breaking below any one boiler may also be determined by means of a further level indicator in the ash discharge chamber beneath the dome valve. In this case the closing of the dome valve and the cessation of operation of the ash breaker will be signalled by a high level of accumulated ash in the discharge chamber.

It should be appreciated that due to the structure of the valve member 61 of dome valve 37 and the seal 71, particles of material lodged on or around seal 71 will be for the most part swept out of the way when the dome valve is closed. Any small particles which remain may be trapped between seal 71 and valve member 61. However, these particles will be sufficiently small that when air is introduced into the space behind seal 71, the seal 71 will deform around these particles and will still provide a good seal against valve member 61.

Although the above described system is concerned with the handling of ash and grit, it will be appreciated that apparatus in accordance with the present invention may be used to handle any other materials for instance dust, sand and many other dry or sticky material,

We claim:

1. Material handling apparatus comprising
   a pipeline or the like,
   means connected to the pipeline for supplying intermittent blasts of high pressure compressed air to the pipeline,
   a material outlet at one end of said pipeline, and
   at least two material inlet members located between said compressed air supply means and said material outlet. each material inlet member being in the form of a chamber opening at the bottom end thereof into the pipeline and extending upwardly from the pipeline, said chamber having in its upper part a spherical closure member which is movable between an open position at which material may be passed into the chamber and a closed position at which material is prevented from passing into the chamber, said chamber being further provided with an annular seal which is mounted for movement to engage with said closure member when said closure member is in its closed position, thereby providing an air tight seal to prevent leakage of compressed air from the pipeline via said inlet member.

2. Material handling apparatus according to claim 1 wherein the material inlet member is also provided with means for reducing the size of solid particles.

3. A material handling apparatus according to claim 2, wherein said means for reducing the size of solid particles comprises two parallel, spaced apart, ash breaker members mounted for rotation with means provided for rotating said two members in directions to cause the ash to pass between said two members.

4. Material handling apparatus comprising two pipelines, one for ash and one for grit, each of said pipelines having a material outlet and means to supply bursts of compressed air at a location remote from said outlet, inlet members to discharge material into said pipelines, said members being located between the material outlet and the compressed air supply means of each pipeline, each material inlet member being in the form of a chamber opening at the bottom end thereof into the pipeline and extending upwardly from the pipeline, said chamber having in its upper part a spherical closure member which is movable between an position at which material may be passed into the chamber and a closed position at which material is prevented from passing into the chamber, said chamber being further provided with an annular seal which is mounted for movement to engage with said closure member when said closure member is in its closed position, thereby preventing an air tight seal to prevent leakage of compressed air from the pipeline via said inlet member.

* * * * *